(12) United States Patent
Kumar et al.

(10) Patent No.: US 12,192,271 B2
(45) Date of Patent: *Jan. 7, 2025

(54) SYSTEMS AND METHODS FOR CLOUD TOPOLOGY MANAGEMENT DURING DEPLOYMENT OF VIRTUAL APPLICATIONS

(71) Applicant: Verizon Patent and Licensing Inc., Basking Ridge, NJ (US)

(72) Inventors: Abhishek Kumar, Bengaluru (IN); Ravi Potluri, Coppell, TX (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,494

(22) Filed: May 10, 2023

(65) Prior Publication Data
US 2023/0283658 A1 Sep. 7, 2023

Related U.S. Application Data

(63) Continuation of application No. 17/457,781, filed on Dec. 6, 2021, now Pat. No. 11,677,814.

(51) Int. Cl.
| | |
|---|---|
| *H04L 67/10* | (2022.01) |
| *H04L 47/762* | (2022.01) |
| *H04L 47/78* | (2022.01) |
| *H04L 67/1008* | (2022.01) |
| *H04L 67/104* | (2022.01) |

(52) U.S. Cl.
CPC ........ *H04L 67/1008* (2013.01); *H04L 47/762* (2013.01); *H04L 47/781* (2013.01); *H04L 67/1053* (2013.01)

(58) Field of Classification Search
CPC . H04L 67/1008; H04L 47/762; H04L 47/781; H04L 67/1053
See application file for complete search history.

(56) References Cited

U.S. PATENT DOCUMENTS

| | | | |
|---|---|---|---|
| 11,258,858 B1 * | 2/2022 | Liu ...................... | H04L 67/141 |
| 2015/0142950 A1 * | 5/2015 | Anderson ............... | H04L 41/50 |
| | | | 709/224 |
| 2015/0142978 A1 * | 5/2015 | Anderson ............. | G06F 9/5044 |
| | | | 709/226 |

(Continued)

*Primary Examiner* — Aftab N. Khan

(57) ABSTRACT

A device may receive application information of an application to be deployed in a cloud computing environment. The application information may include requirement information including information defining a compute requirement of the application, a storage requirement of the application, and a network connectivity requirement of the application, and first capability information identifying requested capabilities of the first set of devices. The device may receive second capability information identifying actual capabilities of the second set of devices. The device may compare the first capability information and the second capability information to determine a measure of similarity between the first capability information and the second capability information. The device may generate deployment information for deploying the application on a device, of the second set of devices, based on the measure of similarity.

20 Claims, 8 Drawing Sheets

(56) References Cited

U.S. PATENT DOCUMENTS

| | | | |
|---|---|---|---|
| 2019/0158367 A1* | 5/2019 | Barooah | H04L 41/5054 |
| 2020/0133738 A1* | 4/2020 | Junior | G06F 9/5077 |
| 2022/0086072 A1* | 3/2022 | Chou | H04L 41/5051 |
| 2022/0188181 A1* | 6/2022 | Saha | G06F 11/0793 |
| 2022/0188654 A1* | 6/2022 | Knuff | G06N 3/047 |

* cited by examiner

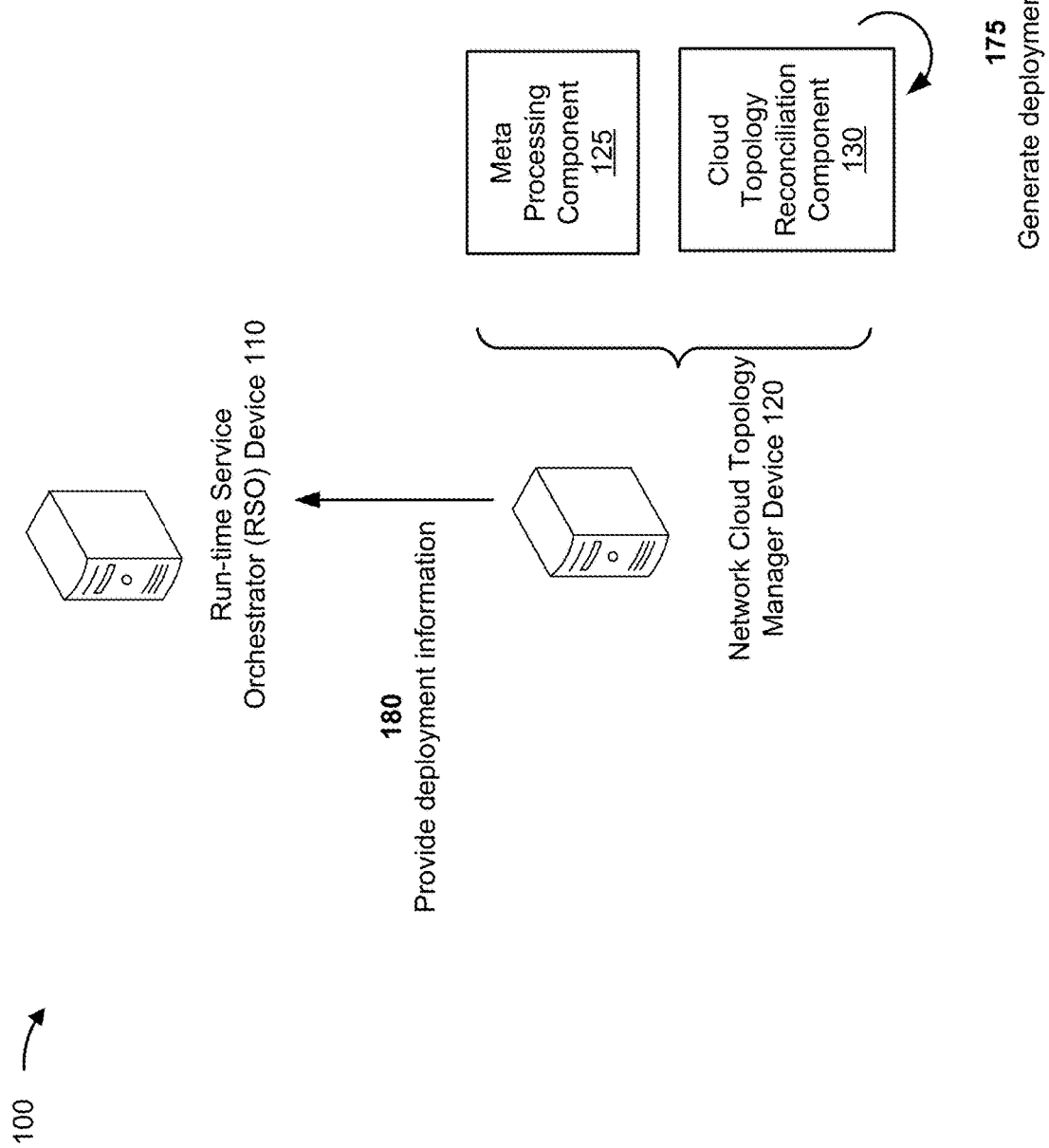

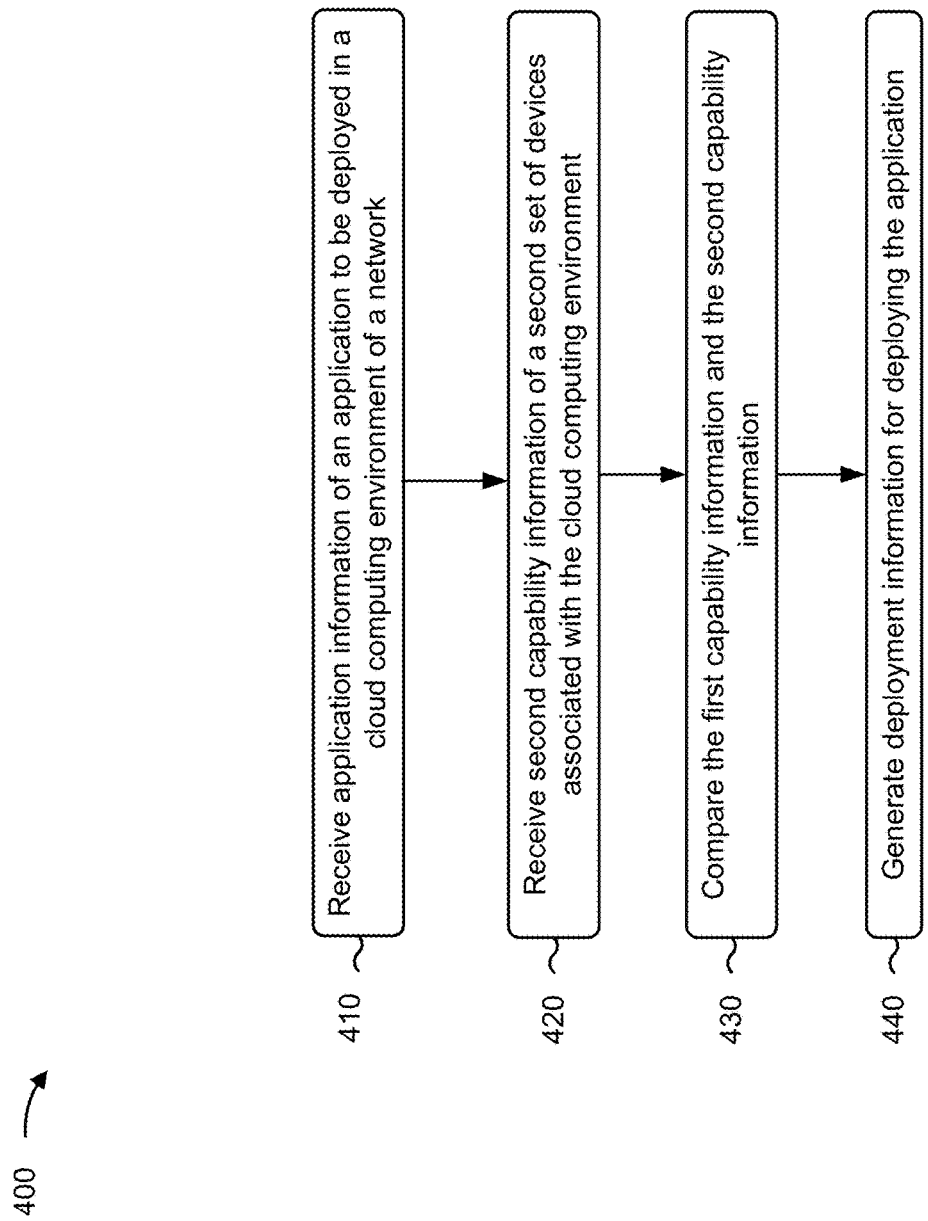

SYSTEMS AND METHODS FOR CLOUD TOPOLOGY MANAGEMENT DURING DEPLOYMENT OF VIRTUAL APPLICATIONS

RELATED APPLICATION

This application is a continuation of U.S. patent application Ser. No. 17/457,781, entitled "SYSTEMS AND METHODS FOR CLOUD TOPOLOGY MANAGEMENT DURING DEPLOYMENT OF VIRTUAL APPLICATIONS," filed Dec. 6, 2021, which is incorporated herein by reference in its entirety.

BACKGROUND

Fifth Generation/New Radio (5G/NR) provides various enhancements to wireless communications, such as flexible bandwidth allocation, improved spectral efficiency, ultra-reliable low-latency communications (URLLC), beamforming, high-frequency (e.g., millimeter wave (mmWave)) communication, and/or other enhancements.

BRIEF DESCRIPTION OF THE DRAWINGS

FIGS. 1A-1E are diagrams of an example associated with cloud topology management during deployment of virtual applications.

FIG. 4 is a flowchart of an example process associated with cloud topology management during deployment of virtual applications.

DETAILED DESCRIPTION OF PREFERRED EMBODIMENTS

Figure 1A:
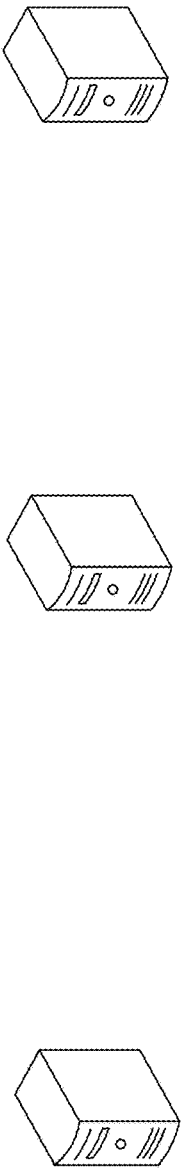
Figure 1A:
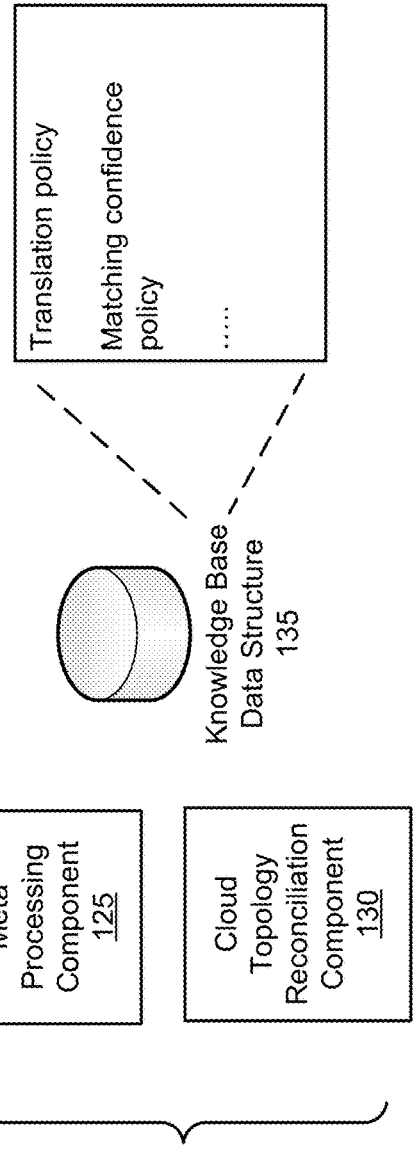

The following detailed description of example implementations refers to the accompanying drawings. The same reference numbers in different drawings may identify the same or similar elements.

An application (e.g., a virtual network function application) may be hosted by a cloud platform of a cloud computing environment. For example, the application (e.g., a virtual radio access network (vRAN) application) may be deployed on a containers as a service (CaaS) platform or on a platform as a service (PaaS) platform. The cloud platform may be supported by an infrastructure, such as a network functions virtualization (NFV) infrastructure.

Due to functional constraints associated with the application, the process of designing and deploying the application can involve a significant amount of effort to ensure that the cloud platform can adequately support the deployment of the application. The functional constraints may require a shared cloud platform and a dedicated infrastructure. In some situations, the functional constraints may be based on a latency requirement of the application, a throughput requirement of the application, and/or a storage requirement of the application.

The current process of designing and deploying an application may not take into consideration capabilities of current resources of the infrastructure. Designing and deploying the application in this manner results in an excessive amount of resources (of the infrastructure) being provisioned, the resources being under-utilized and oversized, and/or cost escalation. Moreover, capabilities of such resources (e.g., compute capabilities, storage capabilities, and/or network connectivity capabilities) may be constantly changing. Therefore, designing and deploying the application in this manner may waste infrastructure resources.

Implementations described herein are directed to a framework that is configured to include information regarding the infrastructure (e.g., NFV infrastructure (NFVI)) during the design and deployment of an application. For example, the framework may enable a network planner to create data models describing unique requested capabilities of resources, of the NFVI, that are desired (or requested) for the deployment of the application. The NFVI may be associated with the network core, the network edge, and/or the network far edge.

In some implementations, the framework may describe the requested capabilities of the resources using meta models or descriptors. The requested capabilities may include compute capabilities, storage capabilities, network connectivity capabilities, acceleration capabilities, network underlay capabilities, network overlay capabilities, among other examples. The framework may receive (e.g., from an Active and Available Inventory (AAI) device) information regarding actual capabilities of actual resources that are provisioned in the network at design time of the application. The framework may compare the descriptors and the information regarding the actual capabilities to determine a correlation between the resources and the actual resources. For example, the framework may compare the descriptors and the information regarding the actual capabilities to determine a measure of similarity between the actual capabilities and the requested capabilities (e.g., determine whether the actual resources are configured to provide the requested capabilities identified by the descriptors).

Based on the measure of similarity, a cloud platform package may be dynamically generated for the deployment of the application on one or more of the actual resources. For example, based on the measure of similarity, a CaaS automation package may be dynamically generated and/or a PaaS automation package may be dynamically generated. In some examples, the cloud platform package may include descriptors regarding the one or more actual resources (e.g., information regarding the actual capabilities of the one or more actual resources). The cloud platform package may also include descriptors regarding acceleration strategies and compute strategies associated with the one or more actual resources (e.g., to improve a performance of the one or more actual resources). The descriptors may be provided in a format that is in accordance with an Internet Engineering Task Force (IETF) standard, such as a Topology and Orchestration Specification for Cloud Application (TOSCA) format, a Yet Another Markup Language (YAML) format, JavaScript Object Notation (JSON) format, among other examples.

By designing and deploying an application as described herein, the framework may preserve resources of the NFVI that would have otherwise been consumed by provisioning an excessive amount of the resources and by under-utilizing the resources. Additionally, or alternatively, by designing and deploying an application as described herein, the framework may preserve computing resources, network resources, and other resources that would have otherwise been used to take remediation actions with respect to the human error associated with the manual approach discussed above.

FIGS. 1A-1E are diagrams of an example 100 associated with cloud topology management during deployment of virtual applications. As shown in FIGS. 1A-1E, example 100 includes a service design creation (SDC) device 105, a run-time service orchestrator (RSO) device 110, an AAI device 115, and a network cloud topology manager device (NCTM) 120. SDC device 105 may include one or more devices capable of receiving, generating, storing, processing, and/or providing information associated with cloud topology management during deployment of virtual applications, as described elsewhere herein. For example, SDC device 105 may provide information regarding requested capabilities of resources of an infrastructure (e.g., an NFVI), as explained in more detail below.

RSO device 110 may include one or more devices capable of receiving, generating, storing, processing, and/or providing information associated with cloud topology management during deployment of virtual applications, as described elsewhere herein. For example, RSO device 110 may receive information for deploying an application and may cause the application to be deployed based on the information, as described in more detail below. In some implementations, RSO device 110 may include an optimization framework of an Open Network Automation Platform (ONAP). The optimization framework may provide information regarding an optimal deployment of the application (e.g., information identifying resources that are more suitable for deployment of the application).

AAI device 115 may include one or more devices capable of receiving, generating, storing, processing, and/or providing information associated with cloud topology management during deployment of virtual applications, as described elsewhere herein. For example, AAI device 115 may be configured to provide information regarding actual capabilities of resources that are provisioned at the design time and/or a time of deployment of the application (e.g., run-time).

NCTM device 120 may include one or more devices capable of receiving, generating, storing, processing, and/or providing information associated with cloud topology management during deployment of virtual applications, as described elsewhere herein. As an example, NCTM device 120 may receive information from SDC device 105 and AAI device 115 and may determine (e.g., using the optimization framework) the optimal deployment of the application. NCTM device 120 may include an application program interface layer that enables NCTM device 120 to interface with the optimization framework of ONAP. NCTM device 120 may generate information that may be provided to RSO device 110 for deploying the application.

As shown in FIG. 1A, NCTM device 120 may include a meta processing component 125, a cloud topology reconciliation component 130, and a knowledge base data structure 135. Meta processing component 125 may be configured to process information received from SDC device 105, as described elsewhere herein. Cloud topology reconciliation component 130 may be configured to determine a correlation between the information received from SDC device 105 and the information received from AAI device 115, as described elsewhere herein.

Knowledge base data structure 135 may include a data structure (e.g., a database, a table, and/or a linked list) that stores one or more translation policies and one or more matching confidence policies. The one or more translation policies may be used to perform translations between information received from SDC device 105 and an IETF standard. The one or more matching confidence policies may be used to determine actions to be performed as a result of comparing information received from SDC device 105 and information received from AAI device 115.

Figure 1B:
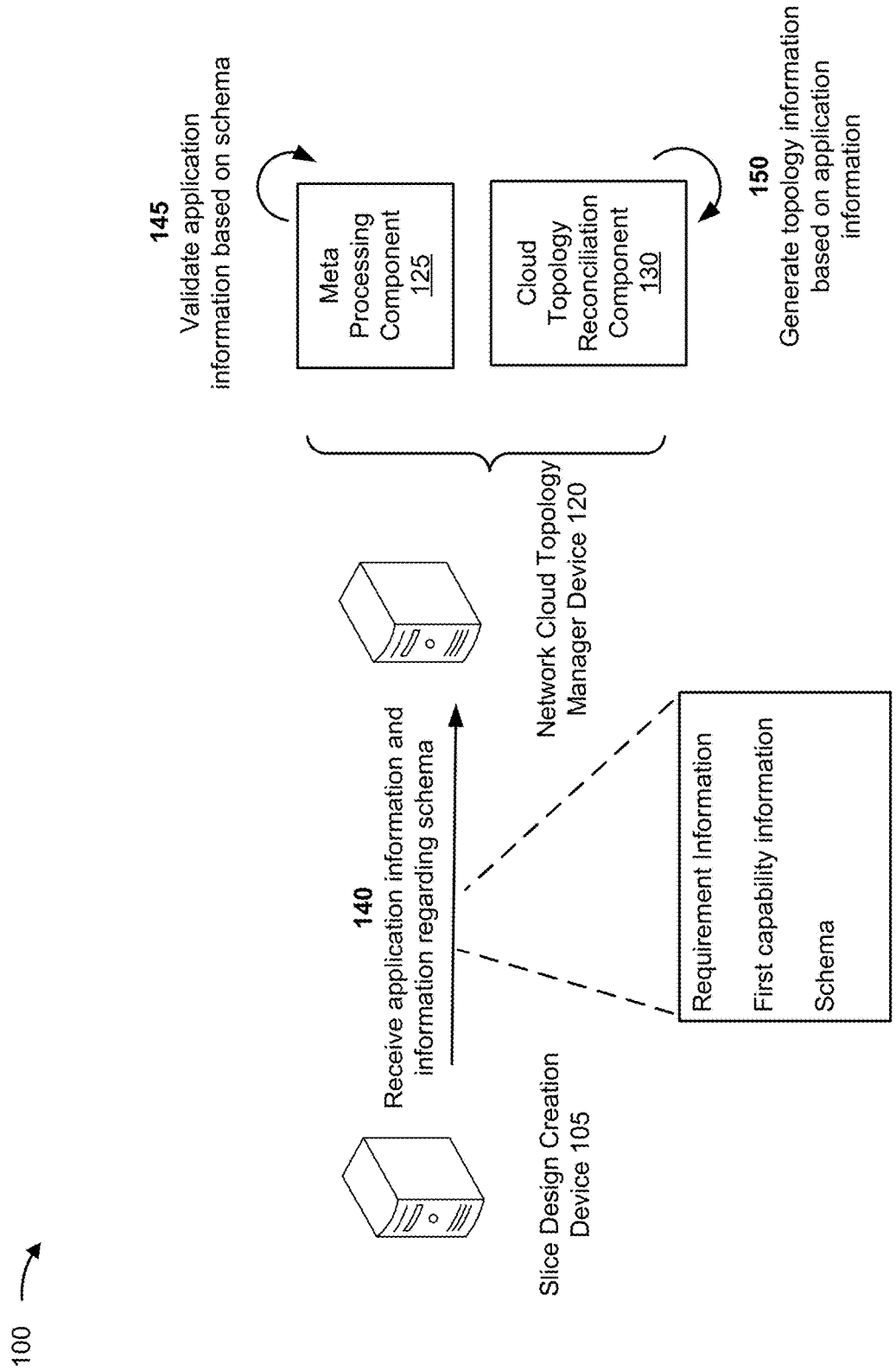

As shown in FIG. 1B, and by reference number 140, NCTM device 120 may receive application information and information regarding a schema. For example, NCTM device 120 may provide a user interface to SDC device 105 to enable a network planner to provide the application information for an application to be deployed and provide the information regarding the schema. As an example, the application may be a virtual network function application, such as a vRAN application. The application may be deployed on an infrastructure (e.g., an NFVI) of a cloud platform (e.g., a CaaS platform or a PaaS platform) of a cloud computing environment.

The application information may include requirement information that includes information defining a compute requirement of the application, information defining a storage requirement of the application, and/or information defining a network connectivity requirement of the application (collectively "requirements of the application"). The requirements of the application may be associated with a throughput requirement and/or a latency requirement. In some implementations, the requirement information may be provided as a data model describing the requirements of the application.

As an example, the requirement information may be provided as descriptors defining the requirements of the application (e.g., a first descriptor defining the compute requirement, a second descriptor defining the storage requirement, and so on). In some examples, the descriptors may include virtual network function (VNF) descriptors. In some situations, the descriptors may provide an abstraction of the requirements of the application.

The application information may further include first capability information that includes information defining requested capabilities of resources of the infrastructure. The requested capabilities may refer to capabilities requested (or desired) by the network planner for the deployment of the application. In this regard, the requested capabilities may be based on the requirements of the application. The resources of the infrastructures may include a first set of devices of the infrastructure.

The first capability information may include information regarding requested compute capabilities of the first set of devices, information regarding requested storage capabilities of the first set of devices, and information regarding requested network connectivity capabilities of the first set of devices. In some examples, the information regarding the requested compute capabilities may include information regarding a virtual central processor unit (CPU), information regarding random access memory, information regarding network interface cards (NICs), information regarding computer network infrastructure, information regarding processor architectures, information regarding plugins (e.g., modular layer 2 plugins), among other examples.

In some examples, the information regarding the requested compute capabilities may include information regarding ephemeral/platform native storage, shared storage, object storage, among other examples. In some examples, the information regarding the requested network connectivity capabilities may include information regarding capabilities (of the first set of devices) with respect to a connectivity associated with an Internet Service. Provider (ISP), a connectivity associated with a private network, a connectivity associated with an overlay network, a connectivity associated with an underlay network, information regarding multi-tenancy (e.g., multi-tenancy isolation enablement), information regarding a number of available internal and external connection points, information regarding a virtual infrastructure manager (VIM) (e.g., multi-VIM registration endpoints), among other examples.

In some situations, the first capability information may include extension information, such as information regarding an acceleration (e.g., information regarding enablement of performance optimization capabilities), information associated with monitoring the performance of the first set of devices, information associated with resource schedulers associated with the first set of devices (e.g., schedulers supported by the infrastructure), information associated with locations of the first set of devices, information associated with scheduling profiles for selecting the first set of devices for deployment of applications, and/or information associated with a shared control plane of the first set of devices.

The information regarding the acceleration may include information regarding CPU pinning, information regarding non-uniform memory access (NUMA) assignment, information regarding Internet Protocol Security (IPSec) acceleration, information regarding programmable acceleration, information regarding smart NIC for network acceleration, information regarding field-programmable gate array (FPGA) acceleration, information regarding enhanced cache management, among other examples.

The information associated with monitoring the performance of the first set of devices may include information regarding temperatures of the first set of devices, information regarding resource utilizations, among other examples. The information associated with the resource schedulers may include information regarding custom scheduler plugins. The information associated with the locations of the first set of devices may include information identifying geographical coordinates, geographical region (e.g., country, state, and/or city) hostnames, host identifiers, a Common Language Information Services identifier, among other examples. The information associated with the scheduling profiles may include information regarding capabilities to support CPU intensive applications, memory intensive applications, storage intensive applications, network intensive applications, FPGA acceleration, and/or smart NICs.

In some situations, the extension information may be an extension to existing standards. For example, the extension information may be data models that may be included in standard bodies, such as ONAP and European Telecommunications Standards Institute (ETSI). In some situations, the first capability information may be based on information regarding resources of the infrastructure previously provided to the network planner. The information regarding the resources may indicate that the first set of devices were previously provisioned in the cloud computing environment.

In some implementations, the first capability information may be provided as a data model describing the requested capabilities of the first set of devices. As an example, the first capability information may be provided as descriptors defining the requested capabilities of the first set of devices (e.g., descriptors defining the requested compute capabilities of the first set of devices, descriptors defining the requested storage capabilities of the first set of devices, and so on). In some examples, the descriptors (defining the requested capabilities) may include NFVI descriptors. In some situations, the descriptors may provide an abstraction of the requested capabilities of the first set of devices.

The schema may be used to validate the application information (e.g., validate a format of the application information). The schema may include information identifying an IETF standard based on which the application information was generated. As an example, the schema may include information identifying TOSCA (e.g., information identifying a specification of TOSCA), information identifying YAML (e.g., information identifying a specification of YAML), information identifying JSON (e.g., information identifying a specification of JSON), among other examples. The schema may include information identifying data types for defining the requirements of the application and data types for defining the capabilities of the resources of the infrastructures of the cloud platform.

As shown in FIG. 1B, and by reference number 145, NCTM device 120 may validate the application information based on the schema. For example, NCTM device 120 (e.g., using Meta Processing Component 125) may verify that the application information complies with the IETF standard used to generate the application information. For instance, if the schema identifies TOSCA, NCTM device 120 may verify that the application information complies with TOSCA; if the schema identifies YAML, NCTM device 120 may verify that the application information complies with YAML, and so on. In some implementations, when validating the application information, NCTM device 120 may verify that a format of the application information complies with a format of the IETF standard used to generate the application information. In some examples, NCTM device 120 may modify the format of the application information to bring the format of the application information in compliance with the format of the IETF standard.

As shown in FIG. 1B, and by reference number 150, NCTM device 120 may generate topology information based on the application information. For example, NCTM device 120 (e.g., using Cloud Topology Reconciliation Component 130) may generate a topology representation (e.g., a topology graph) of the first set of devices and/or the application based on the application information. The topology representation may include nodes representing the first set of devices and/or the application and include edges (between the nodes) that represent relationships between the first set of devices and/or the application. As an example, the topology representation may identify a relationship between the requested compute capabilities of the first set of devices, the requested storage capabilities of the first set of devices, and the requested network connectivity capabilities of the first set of devices As an example, a node (representing a device of the first set of devices) may include information regarding capabilities of the device, such as one or more compute capabilities of the device, one or more storage capabilities of the device, one or more network connectivity capabilities of the device, among other examples described above in connection with the first capability information. As an example, an edge between the node and another node may represent a network connectivity associated with the device and the application or another device (of the first set of devices) represented by the other node.

Figure 1C:
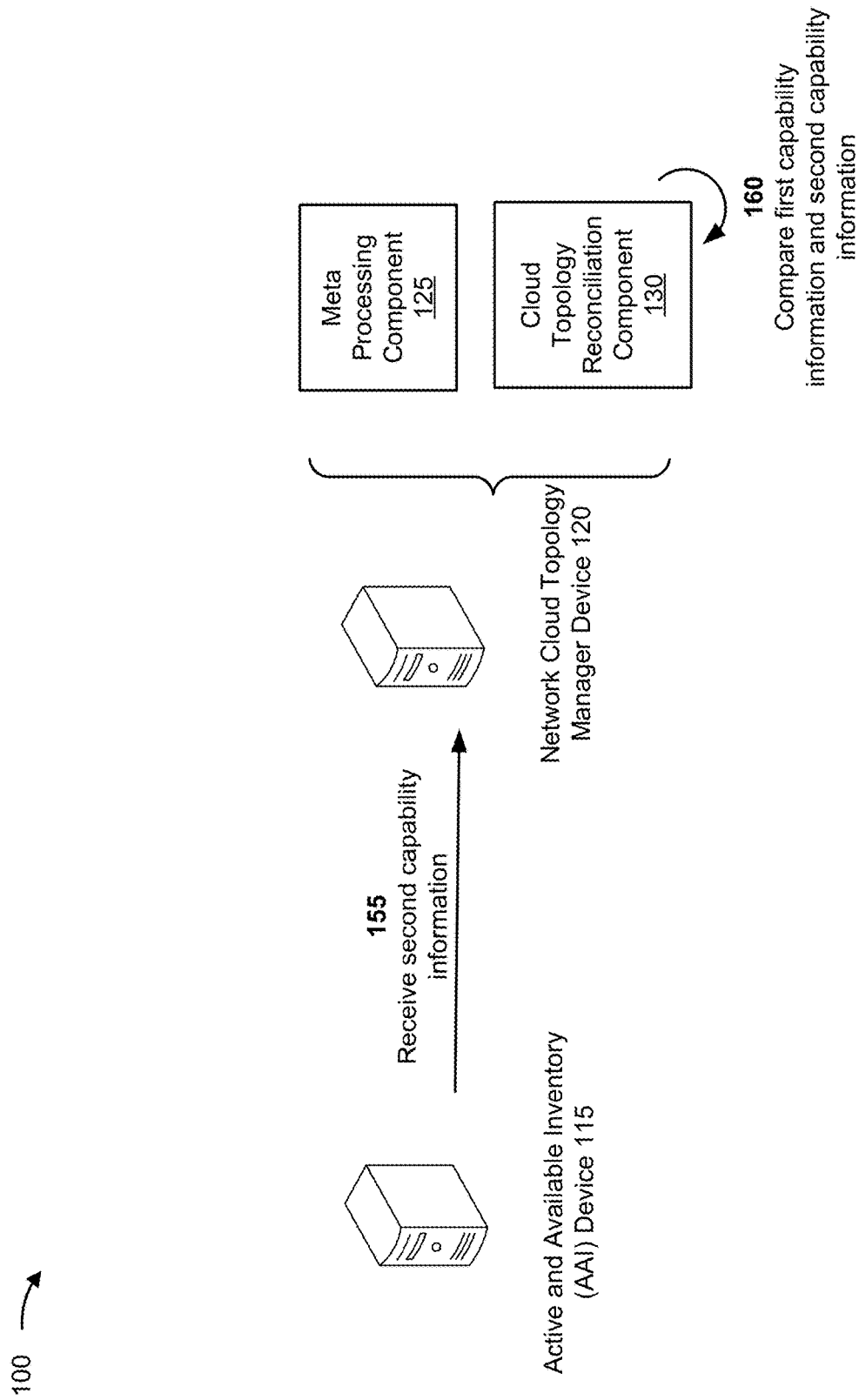

As shown in FIG. 1C, and by reference number 155, NCTM device 120 may receive second capability information. For example, based on receiving the application information from SDC device 105, NCTM device 120 may provide a request, to AAI device 115, for information resources, of the infrastructure, that are currently provisioned in the network. Based on providing the request, NCTM device 120 may receive the second capability information from AAI device 115. The second capability information may include information regarding actual capabilities of actual resources currently provisioned in the network.

As an example, the second capability information may include information regarding actual compute capabilities of a second set of devices, information regarding actual storage capabilities of the second set of devices, information regarding actual network connectivity capabilities of the second set of devices, among other examples of information similar to the information included in first capability information.

The second capability information may identify configurations of the second set of devices. In some implementations, the second capability information may be provided as a data model describing the actual capabilities of the second set of devices, in a manner similar to the manner described above in connection with the first capability information. In some situations, the second set of devices may include one or more of the first set of devices.

As shown in FIG. 1C, and by reference number 160, NCTM device 120 may compare the first capability information and the second capability information. For example, NCTM device 120 (e.g., Cloud Topology Reconciliation Component 130) may compare the first capability information and the second capability information to identify one or more devices, of the second set of devices, that may be best suitable for deploying the application. For instance, NCTM device 120 may compare the first capability information and the second capability information to identify one or more devices, of the second set of devices, with actual capabilities that most closely match the requested capabilities of the first set of devices and, accordingly, may be best suitable for supporting the requirements of the application. In some examples, NCTM device 120 may compare the first capability information and the second capability information by interfacing with the optimization framework.

In some implementations, NCTM device 120 may compare the first capability information and the second capability information by traversing the topology representation. For instance, NCTM device 120 may compare information associated with a node (of the topology representation) and the second capability information. As an example, NCTM device 120 may compare one or more descriptors of a node and one or more descriptors of each device (of the second set of devices). In some examples, NCTM device 120 may obtain one or more tokens, from a descriptor of a node, and obtain one or more tokens from a descriptor of a device of the second set of devices.

For example, NCTM device 120 may obtain first tokens "cpu" and "total" from a descriptor including "Cpu_total" (regarding the compute capability of the node) and obtain second tokens "Total" and "Cpu" from a descriptor including "Total Cpu" (regarding the compute capability of the device). NCTM device 120 may compare the first tokens "cpu" and "total" and the second tokens "Total" and "Cpu" to determine a measure of similarity between the first tokens and the second tokens. In some implementations, NCTM device 120 may use one or more natural language processing techniques to determine the measure of similarity between the first tokens and the second tokens.

NCTM device 120 may perform similar actions with respect to third tokens "Mem" and "total" from a descriptor including "Mem total" (for the node) and fourth tokens "Total" and "RAM" from a descriptor including "Total RAM" (for the device), with respect to fifth tokens "Cpu" and "arch" from a descriptor including "Cpu_arch" (for the node) and sixth tokens "CPU" and "Architecture" from a descriptor including "CPU Architecture" (for the device), and so on until the descriptors of the node and the descriptors of each of the second set of devices have been compared.

NCTM device 120 may perform similar actions for each node of the topology representation by traversing the topology representation. The tokens, from the descriptor of a device (of the second set of devices), may be a key of a key-value pair. The value, of the key-value pair, may be used based on a result of traversing the topology representation, as described below. In some situations, when traversing the topology representation, NCTM device 120 may use a divide and conquer technique. For example, NCTM device 120 may traverse subsets of the topology representation. For example, NCTM device 120 may traverse a first subset of the topology representation, traverse a second subset of the topology representation based on a result of traversing the first subset of the topology representation, and so on.

In some situations, NCTM device 120 may monitor and obtain performance information, such as information regarding temperatures of the second set of devices, information regarding resource utilizations of the second set of devices, among other examples. The performance information may be used to identify one or more devices, of the second set of devices, for the deployment of the application.

Figure 1D:
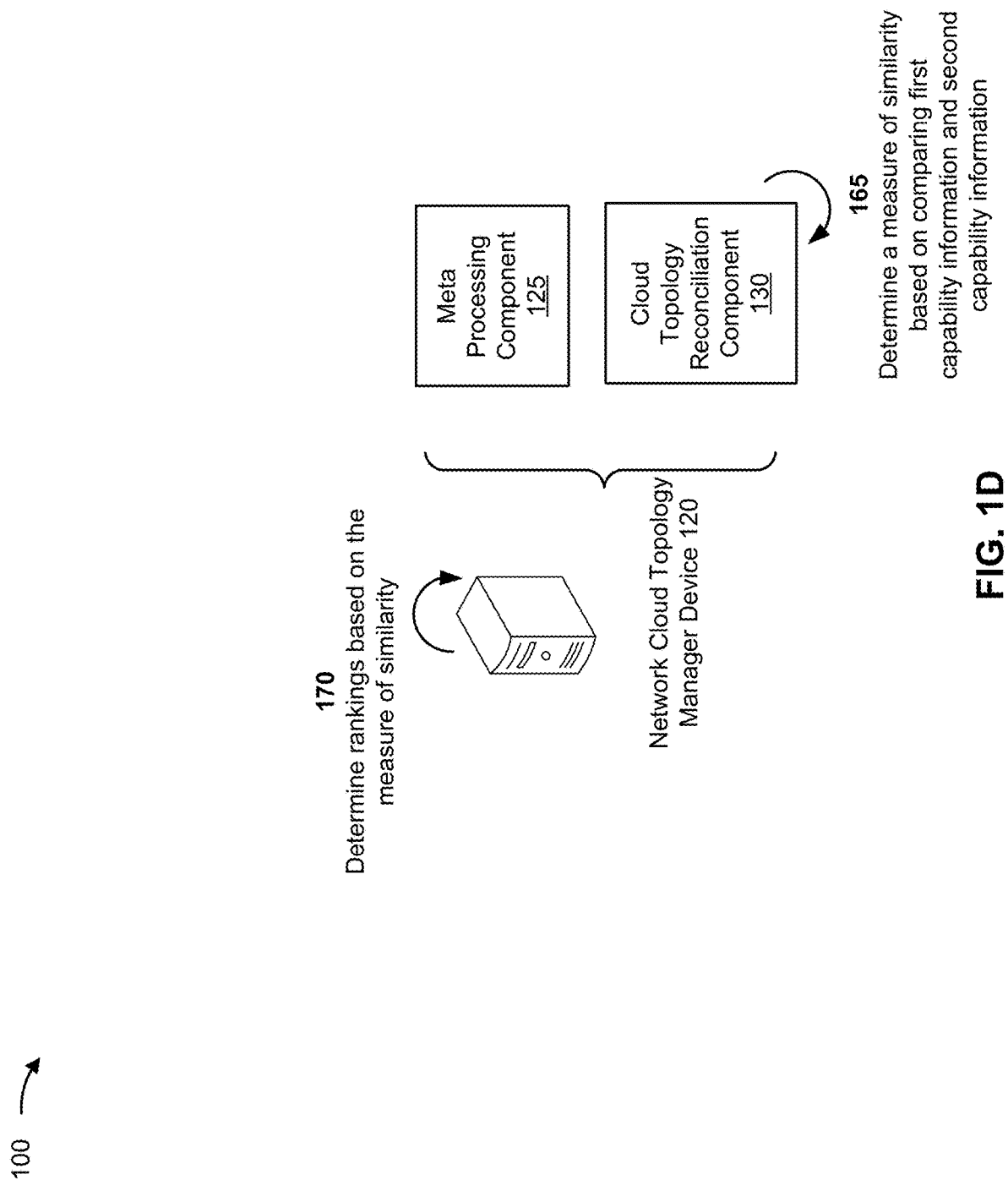

As shown in FIG. 1D, and by reference number 165, NCTM device 120 may determine a measure of similarity based on comparing the first capability information and the second capability information. For example, NCTM device 120 may determine first measures of similarities between a first node (of the topology representation) and the second set of devices, second measures of similarity between a second node (of the topology representation) and the second set of devices, and so on.

For instance, NCTM device 120 may determine a measure of similarity between a vector that includes descriptors of the first node and a vector, for each device of the second set of devices, that includes descriptors of the device. In some implementations, the measure of similarity may include a score. In some examples, NCTM device 120 may compare the first capability information and the second capability information by interfacing with the optimization framework.

As shown in FIG. 1D, and by reference number 170, NCTM device 120 may determine rankings based on the measures of similarity. For example, NCTM device 120 may determine rankings of the second set of devices with respect to the first node based on the first measures of similarity, rankings of the second set of devices with respect to the second node based on the second measures of similarity, and so on.

In some implementations, NCTM device 120 may determine the measure of similarity between the first capability information and the second capability information based on the measures of similarity described above. NCTM device 120 may compare the measure of similarity to different matching confidence thresholds. The matching confidence thresholds may be identified by the one or more matching confidence policies stored in Knowledge Base Data Structure 135. The matching confidence thresholds may include a first matching confidence threshold, a second matching confidence threshold that exceeds the first matching confidence threshold, and a third matching confidence threshold that exceeds the second matching confidence threshold.

NCTM device 120 may cause different actions to be performed based on comparing the measure of similarity to different matching confidence thresholds. For example, NCTM device 120 may compare the measure of similarity to a first matching confidence threshold. If NCTM device 120 determines that the measure of similarity does not satisfy the first matching confidence threshold, NCTM device 120 may determine that the configuration of the second set of devices cannot support deployment of the application. Additionally, or alternatively, NCTM device 120 may determine that the network planner is to manually identify devices, in the infrastructure, that may support the deployment of the application. In this regard, NCTM device 120 may provide, to SDC device 105, information indicating that the configuration of the second set of devices cannot support deployment of the application and/or information indicating that the network planner is to manually identify devices, in the infrastructure, that may support the deployment.

Alternatively, if NCTM device 120 determines that the measure of similarity satisfies the second matching confidence threshold but does not satisfy the third matching confidence threshold, NCTM device 120 may determine that one or more data models (e.g., one or more descriptors) are to be re-generated for a portion of the first capability information. In such an instance, the second capability information may not include any information that matches the portion of the first capability information. Accordingly, NCTM device 120 may provide, to SDC device 105, information identifying the portion and information indicating that the portion was not matched. Additionally, NCTM device 120 may provide, to SDC device 105, information indicating that another data model is to be generated for the portion and re-processed.

As shown in FIG. 1E, and by reference number 175, NCTM device 120 may generate deployment information. For example, if NCTM device 120 determines that the measure of similarity satisfies the third matching confidence threshold, NCTM device 120 may generate the deployment information that may be used for the deployment of the application. When generating the development, NCTM device 120 may identify one or more devices, of the second set of devices, that may be used for the deployment of the application. The one or more devices may be identified based on the rankings of the second set of devices as discussed above in connection with FIG. 1D. For example, NCTM device 120 may identify a first top ranked device out of the rankings of the second set of devices for the first node, a second top ranked device out of the rankings of the second set of devices for the second node, and so on.

NCTM device 120 may map (or add) values, of the key-value pair of the first top ranked device, to the descriptors of the first node, map (or add) values of the key-value pair of the second top ranked device, to the descriptors of the second node, and so on. In some implementations, NCTM device 120 may modify a format of the descriptors of the extension information to comply with a format of an IETF standard. For example, NCTM device 120 may obtain the one or more translation policies and modify the format of the descriptors of the extension information based on the one or more translation policies (e.g., to generate virtual resource descriptors). For instance, NCTM device 120 may map tokens, of the descriptors of the extension information, to corresponding tokens of the IETF standard.

In some implementations, the deployment information may include a recommendation regarding the one or more devices, a recommendation regarding plugins (e.g., modular layer 2 plugins) associated with the one or more devices, a recommendation regarding a preferred device (of the one or more devices) for different types of applications (e.g., CPU intensive applications, memory intensive applications, storage intensive applications, network intensive applications, among other examples), the descriptors, among other examples.

As shown in FIG. 1E, and by reference number 180, NCTM device 120 may provide the deployment information. For example, NCTM device 120 may cause the deployment information to be provided to SDC device 105. In some implementations, NCTM device 120 may provide the deployment information to the optimization framework and the optimization framework may provide the deployment information to RSO device 110. In some examples, the optimization framework may verify that the one or more devices are suitable for the deployment of the application and may verify instantiation policies for instantiating a network service associated with the application. The optimization framework may provide the deployment information (e.g., the recommendation) to RSO device 110, which interacts with SDC device 105 to cause SDC device 105 to generate packages.

By designing and deploying an application as described herein, the framework may preserve resources of the NFVI that would have otherwise been consumed by provisioning an excessive amount of the resources and by under-utilizing the resources. Additionally, or alternatively, by designing and deploying an application as described herein, the framework may preserve computing resources, network resources, and other resources that would have otherwise been used to take remediation actions with respect to the human error associated with the manual approach discussed above.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
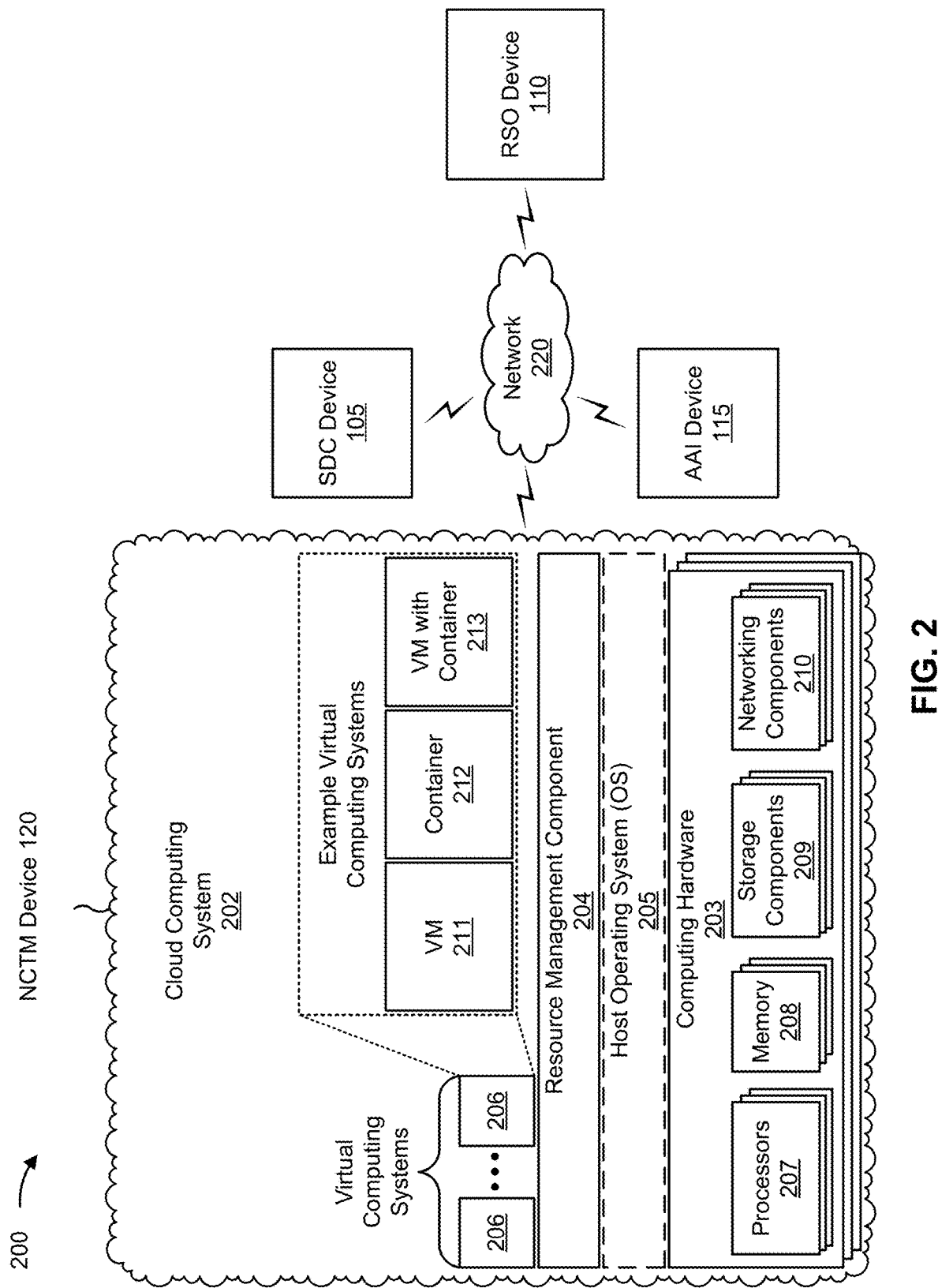
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an NCTM device 120, which may include one or more elements of and/or may execute within a cloud computing system 202. The cloud computing system 202 may include one or more elements 203-213, as described in more detail below. As further shown in FIG. 2, environment 200 may include SDC device 105, RSO device 110, AAI device 115, and/or a network 220. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, Openstack platform, Openshift platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the NCTM device 120 may include one or more elements 203-213 of the cloud computing system 202, may execute within the cloud computing system 202, and/or may be hosted within the cloud computing system 202, in some implementations, the NCTM device 120 may not be cloud-based (e.g., may be implemented outside of a cloud computing system) or may be partially cloud-based. For example, the NCTM device 120 may include one or more devices that are not part of the cloud computing system 202, such as device 300 of FIG. 3, which may include a stand-alone server or another type of computing device. The NCTM device 120 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
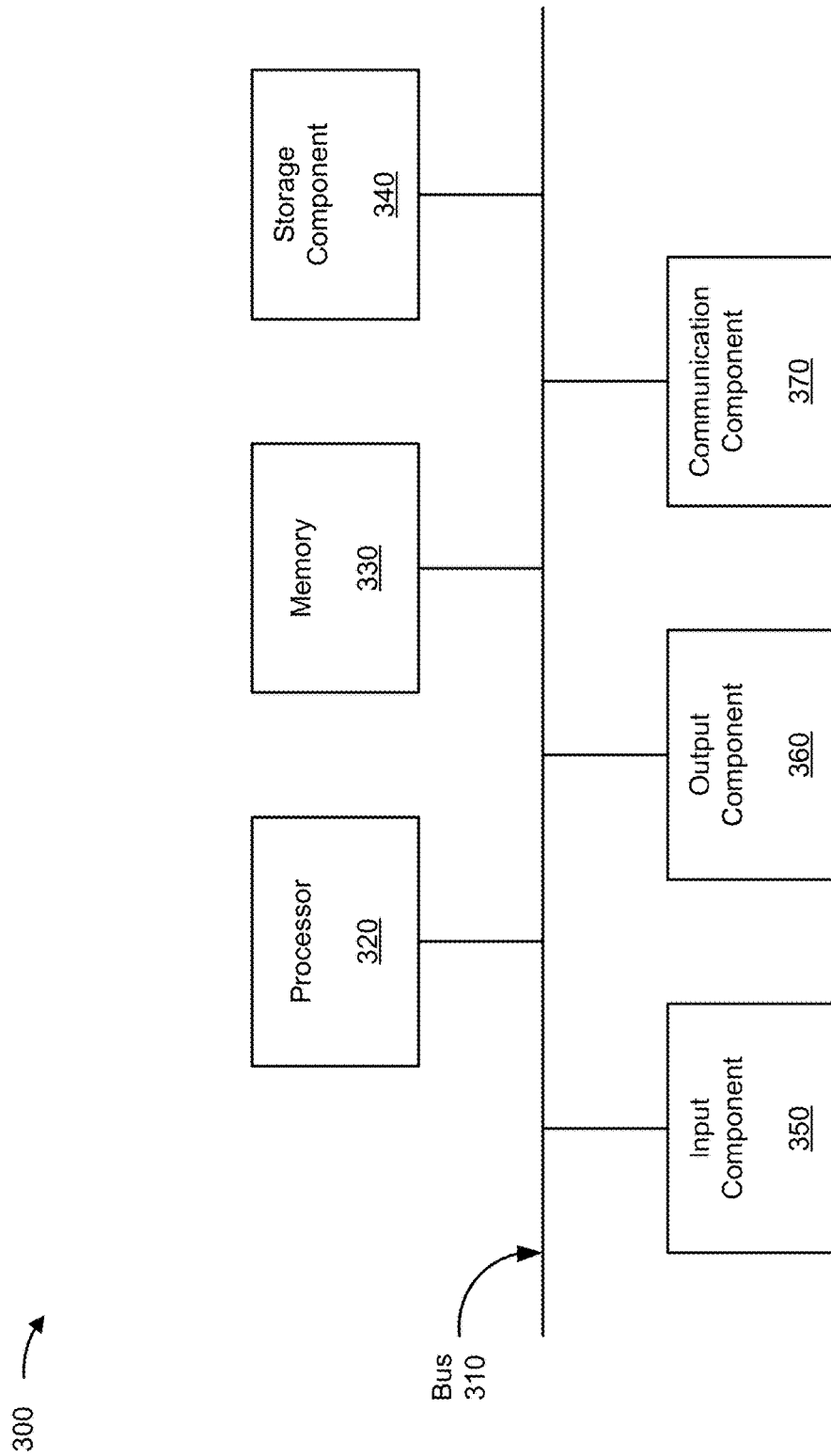
FIG. 3 is a diagram of example components of one or more devices of FIG. 2.

FIG. 3 is a diagram of example components of a device 300, which may correspond to SDC device 105, RSO device 110, AAI device 115, and/or NCTM device 120. In some implementations, SDC device 105, RSO device 110, AAI device 115, and/or NCTM device 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software. The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with cloud topology management during deployment of virtual applications. In some implementations, one or more process blocks of FIG. 4 may be performed by an NCTM device (e.g., NCTM device 120). In some implementations, one or more process blocks of FIG. 4 may be performed by another device or a group of devices separate from or including the NCTM device 120, such as SDC device (e.g., SDC device 105), RSO device (e.g., RSO device 110), and/or AAI device (e.g., AAI device 115). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving, from a second device, application information of an application to be deployed in a cloud computing environment of a network (block 410). For example, the NCTM device 120 may receive, from a second device, application information of an application to be deployed in a cloud computing environment of a network, wherein the application information includes: requirement information including information defining a compute requirement of the application, information defining a storage requirement of the application, and information defining a network connectivity requirement of the application, and first capability information of a first set of devices associated with the cloud computing environment, wherein the first capability information identifies requested capabilities of the first set of devices, as described above.

In some implementations, the first capability information includes information regarding requested compute capabilities of the first set of devices, information regarding requested storage capabilities of the first set of devices, and information regarding requested network connectivity capabilities of the first set of devices. In some implementations, the first capability information further includes at least one of information associated with optimizing a performance of the first set of devices, information associated with monitoring the performance of the first set of devices, information associated with resource schedulers associated with the first set of devices, or information associated with locations of the first set of devices.

In some implementations, process 400 includes receiving, from the second device, a schema that includes information identifying data types for defining compute requirements, storage requirements, network connectivity requirements, and capabilities of devices of the cloud computing environment, comparing the application information and the schema, and validating the requirement information and the first capability information based on comparing the application information and the schema, prior to comparing the first capability information and the second capability information.

As further shown in FIG. 4, process 400 may include receiving, from a third device, second capability information of a second set of devices associated with the cloud computing environment, wherein the second capability information identifies actual capabilities of the second set of devices (block 420). For example, the NCTM device 120 may receive, from a third device, second capability information of a second set of devices associated with the cloud computing environment, wherein the second capability information identifies actual capabilities of the second set of devices, as described above.

In some implementations, the second capability information includes information regarding actual compute capabilities of the second set of devices, information regarding actual storage capabilities of the second set of devices, and information regarding actual network connectivity capabilities of the second set of devices.

As further shown in FIG. 4, process 400 may include comparing the first capability information and the second capability information to determine a measure of similarity between the first capability information and the second capability information (block 430). For example, the NCTM device 120 may compare the first capability information and the second capability information to determine a measure of similarity between the first capability information and the second capability information, as described above.

In some implementations, comparing the first capability information and the second capability information includes determining a measure of similarity between the information regarding the requested compute capabilities and the information regarding the actual compute capabilities, determining a measure of similarity between the information regarding the requested storage capabilities and the information regarding the actual storage capabilities, and determining a measure of similarity between the information regarding the requested network connectivity capabilities and the information regarding the actual network connectivity capabilities.

As further shown in FIG. 4, process 400 may include generating deployment information for deploying the application on a device, of the second set of devices, based on the measure of similarity (block 440). For example, the NCTM device 120 may generate deployment information for deploying the application on a device, of the second set of devices, based on the measure of similarity, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
  receiving, by a device, first capability information that identifies requested capabilities, of a first set of devices, for deploying an application in a cloud computing environment;
  determining, based on the first capability information, a topology associated with the requested capabilities,
    wherein the topology defines a relationship between requested compute capabilities of the first set of devices, requested storage capabilities of the first set of devices, and requested network connectivity capabilities of the first set of devices;
  receiving second capability information that identifies actual capabilities of a second set of devices of the cloud computing environment;
  comparing the first capability information and the second capability information to generate a score; and
  generating deployment information for deploying the application on one or more devices, of the second set of devices, based on the topology and the second capability information,
    wherein the one or more devices are identified based on the score.

2. The method of claim 1, further comprising:
  providing the deployment information to cause software packages, for deploying the application on the one or more devices, to be generated.

3. The method of claim 1, wherein the application is a virtual network function, and wherein the one or more devices are included in a network functions virtualization infrastructure (NFVI).

4. The method of claim 1, wherein the requested capabilities are based on requirements for deploying the application, and
  wherein the method further comprises: receiving requirement information regarding the requirements for deploying the application,
  wherein the requirement information includes information defining a compute requirement of the application, information defining a storage requirement of the application, and information defining a network connectivity requirement of the application.

5. The method of claim 1, wherein the first capability information further includes information associated with monitoring first performance of the first set of devices, and wherein the method further comprises:
  obtaining performance information regarding second performance of the second set of devices; and
  identifying the one or more devices based on the performance information.

6. The method of claim 1, wherein the topology includes a plurality of nodes representing the first set of devices, wherein a node, of the plurality of nodes, includes information regarding one or more requested compute capabilities of a device of the first set of devices, one or more requested storage capabilities of the device of the first set of devices, and one or more requested network connectivity capabilities of the device of the first set of devices, and
  wherein the method further comprises:
    comparing the node and the second capability information to identify the one or more devices.

7. The method of claim 6, wherein comparing the node and the second capability information comprises:
  comparing a first vector that includes first descriptors of the node and second vectors, for the second set of devices, that include second descriptors of the second set of devices.

8. A device, comprising:
  one or more processors configured to:
    receive first capability information that identifies requested capabilities for deploying an application in a cloud computing environment, wherein the requested capabilities include one or more requested compute capabilities, one or more requested storage capabilities, and one or more requested network connectivity capabilities;
receive second capability information that identifies actual capabilities of a set of devices of the cloud computing environment,
wherein the actual capabilities include one or more actual compute capabilities, one or more actual storage capabilities, and one or more actual network connectivity capabilities;
compare the first capability information and the second capability information to generate a score;
generate deployment information for deploying the application on one or more devices, of the set of devices, based on the first capability information and the second capability information,
wherein the one or more devices are identified based on the score; and
cause the application to be deployed on the one or more devices based on the deployment information.

9. The device of claim 8, wherein the one or more processors, to cause the application to be deployed, are configured to:
provide the deployment information to cause software packages, for deploying the application on the one or more devices, to be generated.

10. The device of claim 8, wherein, to compare the first capability information and the second capability information, the one or more processors are configured to:
compare the first capability information and the second capability information to identify the one or more devices.

11. The device of claim 8, wherein, to compare the first capability information and the second capability information, the one or more processors are configured to:
compare the score to different matching confidence thresholds to identify the one or more devices.

12. The device of claim 11, wherein the different matching confidence thresholds include a first confidence threshold, a second confidence threshold that exceeds the first confidence threshold, and a third confidence threshold that exceeds the second confidence threshold, and
wherein, to generate the deployment information, the one or more processors are configured to:
determine that the score satisfies the third confidence threshold based on comparing the score to the different matching confidence thresholds; and
generate the deployment information based on determining that the score satisfies the third confidence threshold.

13. The device of claim 8, wherein the one or more processors, to generate the deployment information, are configured to one or more of:
generate a first recommendation regarding the one or more devices;
generate a second recommendation regarding plugins associated with the one or more devices; or
generate a third recommendation regarding a preferred device for different types of applications.

14. The device of claim 13, wherein the different types of applications include one or more of: a central processor unit intensive application, a memory intensive application, a storage intensive application, or a network intensive application.

15. A non-transitory computer-readable storage medium storing instructions executable by one or more processors of a device, wherein the instructions are configured to:
receive first capability information of a first set of devices associated with a cloud computing environment, wherein the first capability information identifies requested capabilities of the first set of devices;
receive second capability information of a second set of devices associated with the cloud computing environment, wherein the second capability information identifies actual capabilities of the second set of devices;
compare the first capability information and the second capability information to generate a score; and
generate deployment information for deploying an application on one or more devices of the second set of devices,
wherein the one or more devices are identified based on the score.

16. The non-transitory computer-readable storage medium of claim 15, wherein the application is a virtual network function, and
wherein the one or more devices are included in a network functions virtualization infrastructure (NFVI).

17. The non-transitory computer-readable storage medium of claim 15, wherein the instructions, when executed by the one or more processors, further cause the device to:
provide the deployment information to cause the application to be deployed on the one or more devices based on the deployment information.

18. The non-transitory computer-readable storage medium of claim 15, wherein the instructions, that cause the device to compare the first capability information and the second capability information, cause the device to:
compare the score to different matching confidence thresholds to identify the one or more devices.

19. The non-transitory computer-readable storage medium of claim 15, wherein the first capability information further includes information associated with monitoring a performance of the first set of devices, and
wherein the instructions, when executed by the one or more processors, further cause the device to: obtain performance information regarding the second set of devices, and identify the one or more devices based on the performance information.

20. The non-transitory computer-readable storage medium of claim 15, wherein the instructions, that cause the device to generate the deployment information, cause the device to: generate a first recommendation regarding the one or more devices; generate a second recommendation regarding plugins associated with the one or more devices; or generate a third recommendation regarding a preferred device for different types of applications.

* * * * *